(12) United States Patent
Oyman

(10) Patent No.: US 10,681,107 B2
(45) Date of Patent: Jun. 9, 2020

(54) ADAPTIVE VIDEO CONTENT FOR CELLULAR COMMUNICATION

(71) Applicant: Intel IP Corporation, Santa Clara, CA (US)

(72) Inventor: Ozgur Oyman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 86 days.

(21) Appl. No.: 15/569,168

(22) PCT Filed: Dec. 23, 2015

(86) PCT No.: PCT/US2015/000406
§ 371 (c)(1),
(2) Date: Oct. 25, 2017

(87) PCT Pub. No.: WO2016/204712
PCT Pub. Date: Dec. 22, 2016

(65) Prior Publication Data
US 2018/0152499 A1 May 31, 2018

Related U.S. Application Data

(60) Provisional application No. 62/180,530, filed on Jun. 16, 2015.

(51) Int. Cl.
*G06F 15/177* (2006.01)
*H04L 29/06* (2006.01)
(Continued)

(52) U.S. Cl.
CPC ............ *H04L 65/80* (2013.01); *H04L 65/604* (2013.01); *H04L 65/607* (2013.01); *H04L 65/608* (2013.01); *H04L 67/02* (2013.01); *H04N 21/23439* (2013.01); *H04N 21/25825* (2013.01); *H04N 21/4621* (2013.01); *H04N 21/6131* (2013.01); *H04N 21/6336* (2013.01); *H04N 21/64322* (2013.01); *H04N 21/6587* (2013.01);
(Continued)

(58) Field of Classification Search
USPC ................ 709/220, 224, 225, 227, 228, 230
See application file for complete search history.

(56) References Cited

U.S. PATENT DOCUMENTS 8,966,106 B2 2/2015 Wang et al.
9,438,658 B2 9/2016 Oyman
(Continued)

OTHER PUBLICATIONS

International Search Report dated Apr. 18, 2016 for International Application PCT/US2015/00406.
(Continued)

*Primary Examiner* — Lan Dai T Truong
(74) *Attorney, Agent, or Firm* — Eschweiler & Potashnik, LLC

(57) ABSTRACT

An arrangement includes transceiver logic and control logic. The transceiver logic is configured to receive a media presentation description (MPD) for an adaptive streaming over hyper-text transfer protocol (DASH), wherein the MPD includes one or more adaption sets. The control logic is configured to identify device display capabilities, to select quality values based on the device display capabilities and to request use of the selected quality values. The quality values include dynamic range and color space quality values.

10 Claims, 9 Drawing Sheets

(51) Int. Cl.
*H04N 21/2343* (2011.01)
*H04N 21/643* (2011.01)
*H04N 21/6336* (2011.01)
*H04N 21/6587* (2011.01)
*H04N 21/84* (2011.01)
*H04N 21/61* (2011.01)
*H04N 21/845* (2011.01)
*H04N 21/462* (2011.01)
*H04N 21/258* (2011.01)
*H04L 29/08* (2006.01)
*H04W 84/04* (2009.01)

(52) U.S. Cl.
CPC ......... *H04N 21/84* (2013.01); *H04N 21/8456* (2013.01); *H04L 65/1016* (2013.01); *H04W 84/042* (2013.01)

(56) References Cited

U.S. PATENT DOCUMENTS

| 9,762,938 | B2 | 9/2017 | Oyman | |
|---|---|---|---|---|
| 2013/0173737 | A1 | 7/2013 | Liu et al. | |
| 2014/0317308 | A1 | 10/2014 | Zhang et al. | |
| 2015/0019629 | A1 | 1/2015 | Giladi et al. | |
| 2015/0032854 | A1* | 1/2015 | Wang | H04L 65/60 709/219 |
| 2016/0080714 | A1 | 3/2016 | Tsukadoshi | |
| 2016/0156949 | A1 | 6/2016 | Hattori et al. | |
| 2016/0198012 | A1 | 7/2016 | Fablet et al. | |
| 2016/0234144 | A1* | 8/2016 | Hannuksela | H04L 51/063 |
| 2016/0234536 | A1* | 8/2016 | Stockhammer | H04L 67/02 |
| 2017/0195153 | A1* | 7/2017 | Kwak | H04L 29/06 |
| 2018/0131971 | A1* | 5/2018 | Hwang | H04N 21/235 |
| 2018/0176609 | A1* | 6/2018 | Oh | H04N 7/01 |

OTHER PUBLICATIONS

Auborn, Barberio, Lithium Intercalation Cells Without Metallic Lithium, Journal of the Electromechanical Society, Mar. 1987, No. 3, Manchester, NH.
Vetro, Anthony, The MPEG-DASH Standard for Multimedia Streaming Over the Internet, Industry and Standards, Oct.-Dec. 2011, Microsoft Corporation.
Hughes, Kilroy, Potential Extensions of Coding-Independent Code Points, International Organisation for Standardisation, Apr. 2013, Incheon, Korea.
Stockhammer, Thomas, Intended Presentation and Display Characteristics, International Organisation for Standardisation, Nov. 2013, Geneva, Switzerland.
Giladi, Alex, Descriptions of Core Experiments on DASH Amendment, International Organisation for Standardisation, Nov. 2013, Geneva, Switzerland.

* cited by examiner

ADAPTIVE VIDEO CONTENT FOR CELLULAR COMMUNICATION

REFERENCE TO RELATED APPLICATION

This application is a National Phase entry application of International Patent Application No. PCT/US2015/000406 filed Dec. 23, 2015, which claims priority to U.S. provisional application 62/180,530, filed on Jun. 16, 2015, entitled "DYNAMIC ADAPTIVE STREAMING OVER HTTP (DASH)" in the name of Ozgur Oyman and is hereby incorporated by reference in its entirety.

FIELD

The present disclosure relates to mobile communication and video streaming.

BACKGROUND

Mobile communication, including cellular communications, traditionally involved conversational applications, such as voice calls. However, mobile communication is being increasingly used for other applications, such as music and video streaming.

The music and video streaming typically requires larger bandwidth, larger data rates, more power consumption and more complex hardware or circuitry. Also, varied video or media applications have varied requirements. For example, video streaming for a video phone application can be at a lower resolution than a high definition stream for a movie. Additionally, some media applications are one way and others are two way. A movie is an example of one way stream wherein the video phone application is an example of two way streaming.

DETAILED DESCRIPTION

Figure 1:
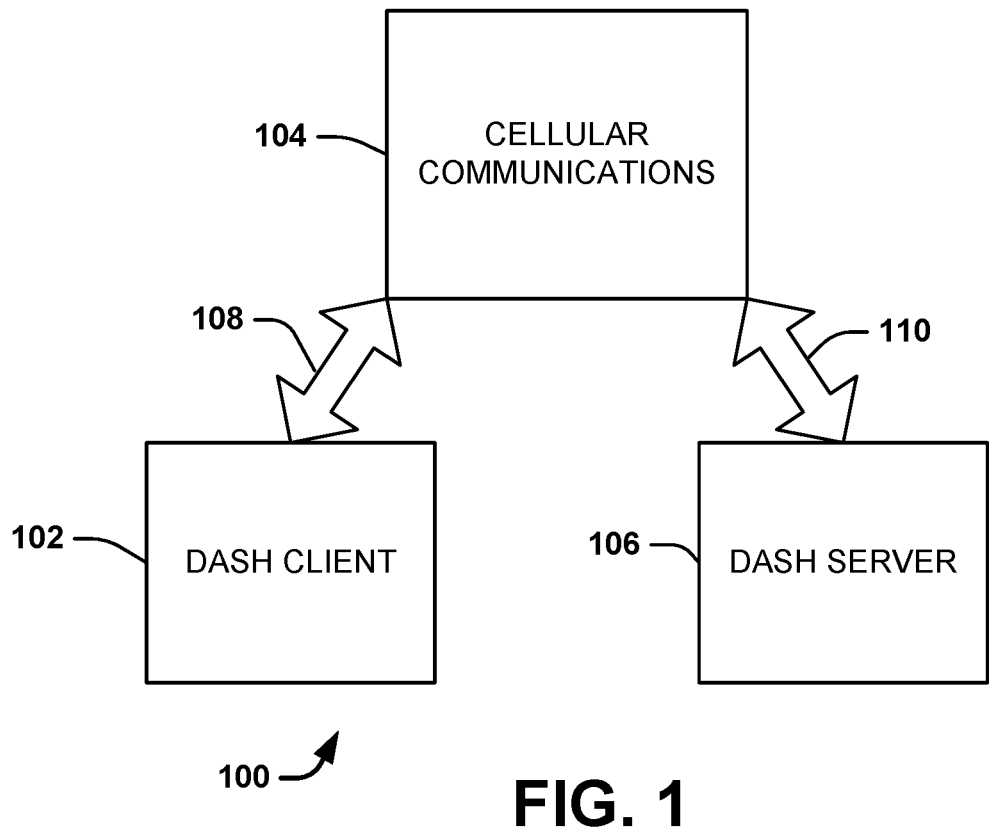
FIG. 1 is a diagram illustrating an arrangement for dynamic adaptive streaming over HTTP (DASH) that incorporates dynamic range and color space information in accordance with various aspects.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

HTTP streaming is spreading widely as a form of multimedia delivery of Internet media, including video. HTTP-based delivery provides reliability and deployment simplicity due to the already broad adoption of both HTTP and its underlying TCP/IP protocols. Dynamic adaptive streaming over HTTP (DASH) is a technology standardized in 3GPP TS 26.247 and MPEG ISO/IEC 23009-1. In DASH, a media presentation description (MPD) metadata file provides information on the structure and different versions of the media content representations stored in the server (including different bitrates, frame rates, resolutions, codec types, etc.). In addition, DASH also specifies the segment formats, i.e., containing information on the initialization and media segments for the media engine to ensure mapping of segments into a media presentation timeline for switching and synchronous presentation with other representations. Clients request the segments using HTTP GET or partial GET methods based on this MPD metadata information that describes the relation of the segments and how they form a media presentation. The client controls the streaming session, i.e., it manages the on-time request and smooth playout of the sequence of segments, potentially adjusting bitrates or other attributes, e.g., to react to changes of the device state or the user preferences.

An internet protocol (IP) multimedia subsystem (IMS) is a standard for converged, fixed and mobile real-time multimedia communication using media capabilities such as voice, real-time video, text, file transfer, pictures, audio, video clips and the like. The 3GPP TS 26.114 standard describes multimedia telephony services over IMS (MTSI) that allows delivery of advanced multimedia conversational services and content over IMS-based networks. This includes specification of media handling and interaction, which includes media control, media codecs, as well as transport of media and control data. A MTSI call uses the Call Session Control Function (CSCF) mechanisms to route control plane signaling between the UEs involved in the call. In the control plane, Application Servers (AS) should be present and may provide supplementary services such as call hold/resume, call forwarding and multi party calls, etc.

MTSI-based transmitter UE terminal captures and records video, and transfers it to the MTSI-based receiver UE terminal over the 3GPP network, which decodes and renders the video. In MTSI, the session initiation protocol (SIP) serves as the application-layer control protocol to establish, modify, and terminate conversational multimedia sessions such as video conferences, Internet telephony calls, etc. Session description protocol (SDP) based signaling between the sending and receiving terminals allow for offer/answer considerations in the media-related capability negotiation, including codecs, bitrates, resolutions, etc. The transport of media in MTSI is based on the real-time transport protocol (RTP) (specified by IETF RFC 3550) over UDP/IP.

TVs providing Standard Dynamic Range (SDR) typically support content with brightness in the range of the order of 0.1 to 100 nits. A nit is a unit of visible-light intensity, commonly used to specify the brightness of a cathode ray tube or liquid crystal display computer display. One nit is equivalent to one candela per square meter. However, that range is significantly smaller than the range that the human eye can see in real life. For example, a light bulb can have much more than 10,000 nits, surfaces lit in the sunlight can have brightness upwards of 100s of thousands of nits, while the night sky can be as low as 0.005 nits (or lower).

The human visual system is able to adapt to lighting conditions that vary by nearly 10 orders of magnitude. For example, within a scene, the human visual system functions over a range of around five orders of magnitude simultaneously.

This human visual system is much larger than typical cathode ray tube (CRT) displays, which are able to reproduce only around two orders of magnitude of intensity variation. Their limitation lies in the fact that phosphors cannot be excited beyond a given limit. For this reason, 8-bit D/A converters are traditionally sufficient to generate analog display signals. Higher bit depths are usually not used because the display would not be able to reproduce such images at levels that are practical for human viewing.

Because legacy display devices are not able to reproduce a range of luminances anywhere near the capability of the human visual system, images are typically encoded with a byte per color channel per pixel. This encoding normally happens when the image is captured. Unfortunately, this lower encoding results in much of the information available in a scene being irretrievably lost at capture time.

Future TVs, various video distribution environments and the like are expected to give a viewing experience that is closer to a real life experience and to provide to a user the sense of "being there". This requires supporting significantly higher dynamic ranges as well as broader color gamut. Thus, the new content will not only have several orders of magnitude larger brightness and contrast, but also significantly wider color gamut (for example, BT. 2020 or even wider than that in the future, providing colors that are significantly richer than the ones provided by today's standard, e.g. BT. 709.)

The achievable and desired brightness ranges and the dynamic ranges of various displays may be significantly different than those on the capturing and creating ends. For example, a content creation system may be able to create or capture content with contrast of 1,000,000:1 but it may be neither desirable nor feasible to have displays with that range.

Current DASH content formats or MPD do not include a mechanism to convey dynamic range or color space information for the content. This can cause a mismatch between the capabilities of the display device and capture device. In conversational video services such as IMS/VoLTE or MTSI, there is no way to negotiating display and capture capabilities in terms of dynamic range or color space causing a possible mismatch between the capabilities of the sender and receiver terminals.

The present disclosure provides various embodiments or aspects related to multimedia content over cellular communications. Embodiments or aspects are provided that include a mechanism to include signal dynamic range and color space information as part of the DASH MPD or content format. As a result, a receiver is informed about the available dynamic range and color spaces in the content and can adaptively choose the content that best matches with its display capabilities and the like. Furthermore, embodiments are provided for a mechanism to perform quality-aware streaming and content adaptation at the DASH client based on quality characteristics determined for different configurations of dynamic range and color space. In addition, embodiments/aspects relating to media handling and session management for conversational video services toward enabling multimedia adaptation capabilities based on exchange of dynamic range and color space information are also provided.

FIG. 1 is a diagram illustrating an arrangement 100 for dynamic adaptive streaming over HTTP (DASH) that incorporates dynamic range and color space information in accordance with various aspects or embodiments. The dynamic range and color space information facilitate streaming adaptations that correspond to both media server capabilities and media client capabilities.

The arrangement is shown with one way server to client adaptive streaming for illustrative purposes. However, the shown description can be extended for two way streaming and one to many broadcasting or streaming.

The arrangement 100 includes a DASH client 102 and a DASH server 106 and utilizes a cellular communications network 104. The DASH client 102 is connected to the communications network 104 via communications 108 and the DASH server 106 is connected to the communications network 104 via communications 110.

The cellular communication network 104, the communications 108, and the communications 110 can include a variety of components including, but not limited to, base stations, evolved node Bs (eNodeBs), mobile devices, user equipment (UEs), network controllers, network entities and the like. The cellular communications network 104 utilizes a suitable communications standard, such as 3GPP.

The DASH client 102 can be coupled to and/or part of a mobile device or UE. The DASH client 102 includes a media or video display, such as an LCD screen, television display, cathode ray tube (CRT) and the like. The display has associated client dynamic range and/or color space capabilities. The client dynamic range is a range of brightness and can be specified in nits. As described above, an SDR has a brightness range in the order of 0.1 to 100 nits. A lightbulb can have a brightness at about 10,000 nits. The client dynamic range can also be specific in terms of orders of magnitude of intensity or luminance variation. For example, a CRT has about two orders of magnitude of intensity variation.

The client color space is specified in depth or levels. The client color space can include, for example, an RGB model based on red, green and blue. The client color space can also include a CMYK model based on cyan (C), magenta (M), yellow (Y), and black. It is appreciated that other color space models can be used. The depth or levels are represented in bits. More bits yield a deeper or broader color space. For example, an 8 bit color space system provides 256 color variations. Other dynamic range and color space models are provided infra.

The DASH server 106 can also be coupled to and/or part of a mobile device or UE. The DASH 106 server includes, for example, a media segmenter, media encoder, dynamic range component, a color space component and the like. The DASH server 106 is configured to receive media input from media source, such as a video or media capture device.

The media input has incoming characteristics, such as resolution, video rate and the like. The incoming characteristics also include an incoming dynamic range and an incoming color space. In one example, these incoming characteristics are fixed. In another example, the DASH server 106 is configured to adjust or alter the incoming characteristics, such as by controlling a capture device.

The DASH 106 server is configured to selectively encode and segment the media input into a plurality of fragments. The DASH 106 server is also configured to generate and/or provide a media presentation description (MPD). The MPD includes information on the structure and versions of the media content including, but not limited to bitrates, frame rates, resolutions, code types and the like. The MPD also includes information on dynamic range and/or color space, referred to as server dynamic range and server color space. The server dynamic range includes ranges of provided or provide-able intensities, such as described with regard to the client dynamic range. Similarly, the server color space includes a depth or levels of colors provided or provideable, such as described above with regard to client color space.

In operation, the DASH client 102 requests a media content from the DASH server 106 via the communication network 106. The request can include client color space and/or client dynamic range information. The DASH server 106 responds with information about the media content in the form of the MPD. The MPD includes information, as shown above, that includes a server dynamic range and a server color space for the requested media content. The MPD also specifies the segment formats for initialization and media segments to map segments into a local media content or presentation.

An example of an MPD is provided below. The MPD can include one or more periods, which represent time durations or a timeline. Each period can include one or more adaptation sets. The adaptation sets include capabilities, versions, bitrates, and the like. Additionally, the adaptation sets include dynamic range and color space attributes or information.

The DASH client 102 identifies or matches suitable values for the requested media content. The matching values include, for example, bitrates, frame rates, resolution, codec type and the like. The matching values also include a matching color space and a matching dynamic range. The matching values are also referred to as quality values. The DASH client 102 and the DASH server 106 can negotiate via one or more signals to determine the matching values, including matching values for color space and dynamic range.

The DASH client 102 requests one or more fragments and provides the matching values for the requested media content. The DASH server 106 provides the one or more fragments according to the provided matching values. The DASH client 102 is configured to receive and assemble the provided fragments into a local media content.

The DASH client 102 can alter the matching values for additional fragment requests. These values can adaptively change in response to bandwidth variations, available power, and the like.

It is appreciated that the DASH server 106 can include all or some of the capabilities of the DASH client 102. Additionally, it is appreciated that the DASH client 102 can include some or all of the capabilities of the DASH server 106.

Figure 2:
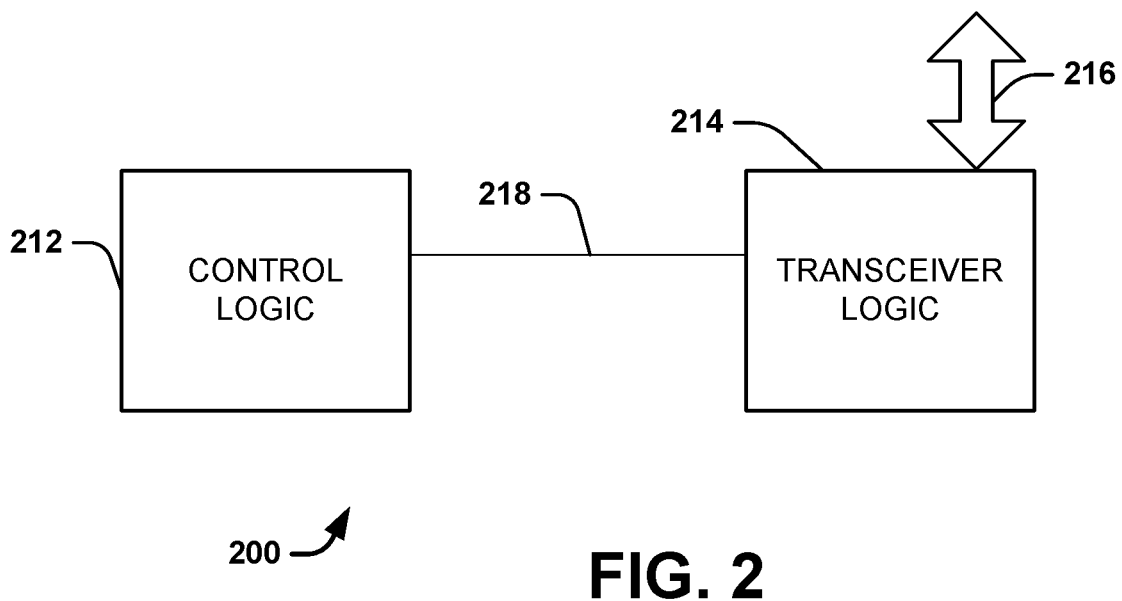
FIG. 2 is a diagram illustrating an example DASH client in accordance with various aspects.

FIG. 2 is a diagram illustrating an example DASH client 200 in accordance with various aspects or embodiments. The DASH client 200 is incorporated in a mobile device or UE, in this example. The DASH client 200 can be utilized in the arrangement 100, described above.

The DASH client 200 includes transceiver logic 214 and control logic 212. The transceiver logic 214 is configured to send DASH related requests and receive DASH related responses via a cellular network 216.

The control logic 212 is configured to initiate a request for media content from a DASH server (not shown). The control logic 212 receives a media presentation description (MPD) that includes available server dynamic range and server color space for the requested media content. The MPD includes a variety of information including bitrate, resolution and the like.

The control logic 212 is configured to identify device display capabilities for an associated display. The display can be a TV, LCD screen or CRT. The device display capabilities can be known and stored in a memory component in one example. In another example, the device display capabilities are detected by the control logic 212.

The control logic 212 is configured to determine or select matching values based on the MPD values and the identified device display capabilities. The matching values are also referred to as quality values. The control logic 212 provides the quality values via the transceiver logic 214.

The control logic 212 then requests segments of the media content in accordance with the quality values.

Figure 3:
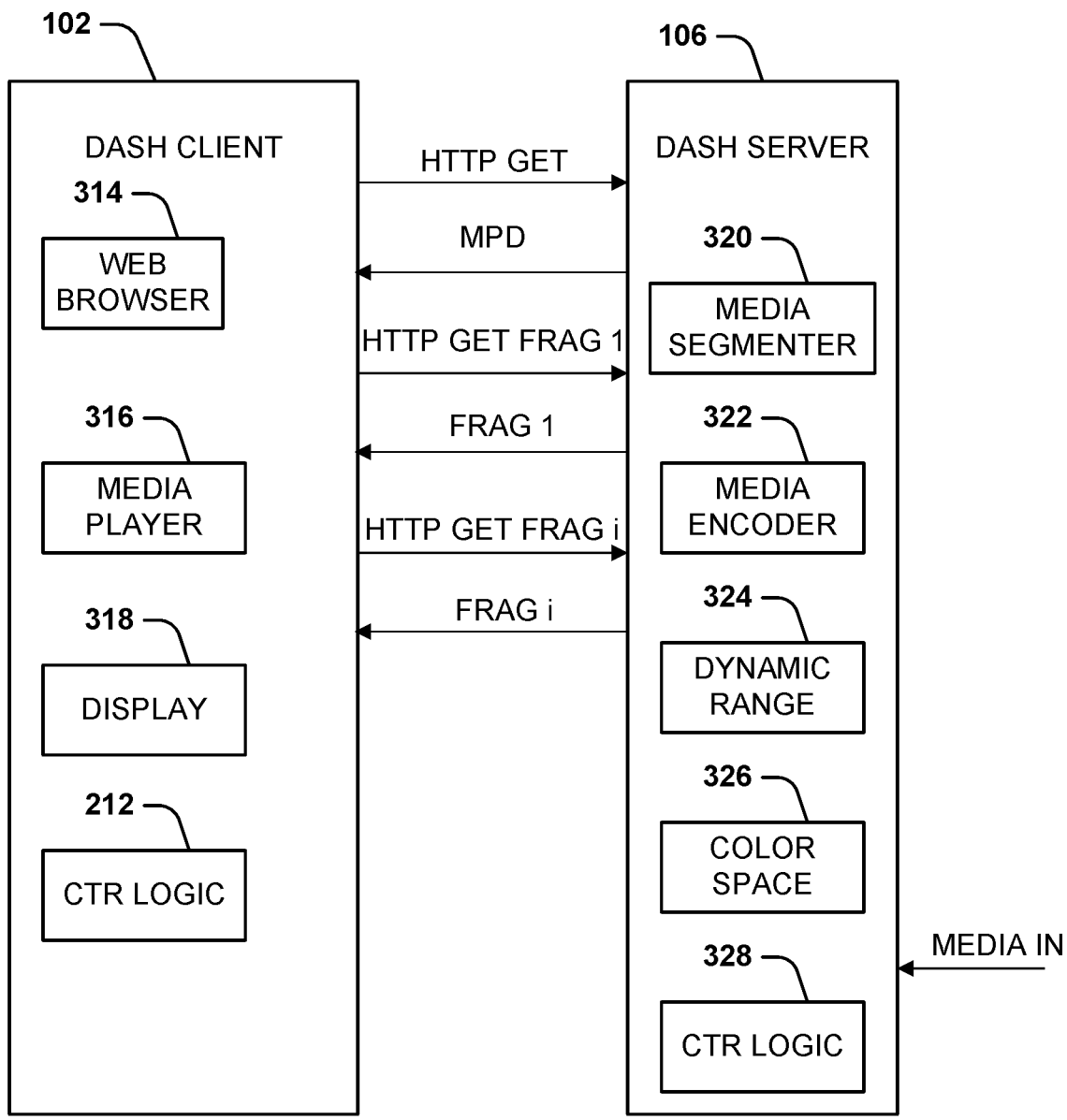
FIG. 3 is a diagram illustrating an arrangement for dynamic adaptive streaming over HTTP (DASH) that incorporates dynamic range and color space information in accordance with various aspects

FIG. 3 is a diagram illustrating an arrangement 300 for dynamic adaptive streaming over HTTP (DASH) that incorporates dynamic range and color space information in accordance with various aspects or embodiments. The dynamic range and color space information facilitate streaming adaptations that correspond to both media server capabilities and media client capabilities. The arrangement 300 is similar to the arrangement 100, but is provided with additional details. It is appreciated that additional components can be utilized and shown components can be omitted in various aspects.

The arrangement is shown with one way server to client adaptive streaming for illustrative purposes. However, the shown description can be extended for two way streaming and one to many broadcasting or streaming.

The arrangement 300 includes a DASH client 102 and a DASH server 106. The DASH client 102 and the DASH server 106 communicate via a cellular network (not shown).

The DASH server 106 includes a media segmenter 320, a media encoder 322, a dynamic range component 324 a color space component 326, and a server control logic 328. The DASH server 106 is configured to receive media content via a MEDIA INPUT.

The media encoder 322 is configured to encode media content in accordance with one or more quality values. These quality values include bitrate, frame rate, resolution, codec types, color space, dynamic range, and the like. The media encoder 322 can provide its output in a suitable format, such as a stream, file and the like.

The media segmenter 320 is configured to format and segment the media encoder output into one or more fragments according to the quality values. Each fragment includes a portion of the media encoder output and an index, which represents its order or placement to facilitate reconstructing at the client end. The quality values can specify the fragment size and the like. In one example, the fragments have an order from 1 to i, where i is an integer.

The media segmenter 320 can also be configured as a packetizer and configured to packetize the media encoder output (encoded media content) into one or more packets, such as one or more real-time transport protocol (RTP) packets.

The dynamic range component 324 is configured to adjust or modify the dynamic range of the media content based on a dynamic range quality value. In one example, the dynamic range component 324 directly alters the media content. In another example, the dynamic range component 324 adjusts encoding performed by the media encoder 322. In yet another example, the dynamic range component 324 adjusts a media source, such as a video capture device or camera, to alter the dynamic range of the media content.

The color space component 326 is configured to adjust or modify the color space of the media content based on a color space quality value. In one example, the color space component 326 directly alters the media content to alter its color space, such as be increasing to 16 bits from 8 bits. In another example, the color space component 326 adjusts encoding performed by the media encoder 322. In yet another example, the color space component 326 adjusts a media source, such as a video capture device or camera, to alter the dynamic range of the media content.

The server control logic 328 is configured to negotiate with the DASH client and interact with the other components, including the color space component 326 and the dynamic range component 324.

The DASH client 102 includes a web browser 314, a media player 316, a display 318 and control logic 212. The web browser 314 is configured to or used to identify media content at the DASH server 106. The web browser 314 also initiates requests for additional fragments. In one example, the web browser 314 requests the fragments based on user input, such as play. In another example, the web browser 314 halts sending of additional fragments based on user input, such as pause.

The media player 316 is configured to play received and/or reconstructed media content using the display 318. The media player 316 has decoding capabilities that are compatible with the reconstructed media content and in accordance with the quality values. The medial player 316 has media playing functionality, such as pause, fast forward, reverse and the like.

The display 318 is configured to play reconstructed media content from the media player 316. The display 318 has associated capabilities, such as resolution, frame rate and the like. The display 318 also has associated capabilities including a dynamic range and a color space.

The control logic 212 is configured to request and obtain media content from the DASH server 106. The control logic 212 is configured to identify client capabilities, including the display capabilities, and provide that information as the quality factors. The control logic 212 is also configured to reconstruct media content from received fragments by ordering and reconnecting the fragments.

An example operation is described. Media content of the DASH server 106 is identified by the web browser 314 and a request in the form of an HTTP GET is generated by the control logic 212. The request identifies the media content. The DASH server 106 responds with an MPD, which includes information on the structure and versions of the media content including, but not limited to bitrates, frame rates, resolutions, code types and the like. The MPD also includes information on dynamic range and/or color space, referred to as server dynamic range and server color space.

The DASH client 102 requests a first fragment and provides quality values. The quality values are generated by the control logic 312 based on the MPD and its device capabilities. The DASH server 106 provides a first fragment of the media content. The first fragment and additional fragments are generated based on the quality values and have a specified fragment format. The DASH client 102 receives the first fragment and requests additional fragments with one or more additional HTTP GET requests. The DASH server 106 provides the additional fragments in response. In one example, the fragments are provided by the DASH server 106 sending a URL location for each fragment. The additional fragments can be requested in groups or chunks of fragments, where a chunk for additional fragments is requested, followed a second chunk of additional fragments and even more chunks.

The DASH client 102 receives the additional fragments and the control circuit 212 reconstructs the received fragments into a reconstructed media content. The reconstructed media content can be played by the media player 316 and displayed on the display 318.

The DASH client 102 controls the streaming session by managing the requests and providing a smooth playout of the reconstructed content. The DASH client 102 can reduce or increase the bitrate, frame rate and the like to react to changes in its device state and/or user preferences. Thus, revised quality parameters can be provided to account for changes in the device state and/or user preferences.

Figure 4A:
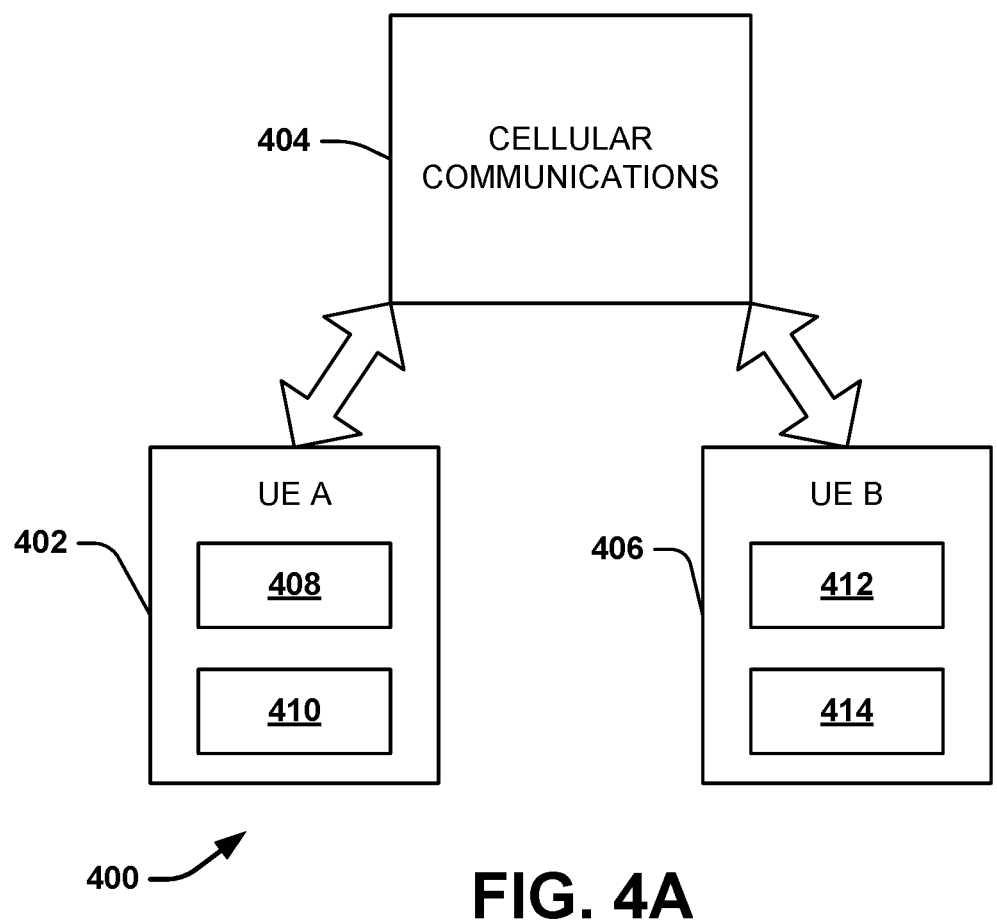
FIG. 4A is a diagram illustrating an arrangement for conducting multimedia telephony services in accordance with various aspects.

FIG. 4A is a diagram illustrating an arrangement 400 for conducting multimedia telephony services in accordance with various aspects or embodiments.

The arrangement 400 includes cellular communications 404, first user equipment (UE) 402 and a second UE 406. The arrangement 400 provides multimedia telephone services between operators or UEs using a telephone service.

A suitable telephony service uses 3GPP TS 26.114, which describes a multimedia telephony services over IMS (MTSI) that allows delivery of advanced multimedia conversational services and content over IMS-based networks. This includes specification of media handling and interaction, which includes media control, media codecs, as well as transport of media and control data.

The first UE 402 includes components including a call session control function (CSCF) component 408 and an application server (AS) 410. The CSCF component 408 is configured to route control plane signaling between the first UE 402 and the second UE 406, which are involved in a call. The AS 410 provides supplementary call services, such as call hold, resume call, call forwarding, multi-party calls and the like.

The second UE 406 includes components including a second call session control function (CSCF) component 412 and a second application server (AS) 414. The CSCF component 412 is configured to route control plane signaling between the first UE 402 and the second UE 406, which are involved in a call. The AS 414 provides supplementary call services, such as call hold, resume call, call forwarding, multi-party calls and the like.

The first UE 402 includes additional components (not shown) for capturing video and audio and a display and speaker for presenting video and audio. The first UE 402 captures and records video and/or audio and transfers it to the second UE 406 over the cellular communications 404. The second UE 406 is configured to decode and render the audio and video.

The first UE 402 is configured to establish, modify and terminate conversational multimedia sessions, such as video conferences, internet telephony calls and the like. A session description protocol (SDP) based signaling can be used between the first UE 402 and the second UE 406 to allow offer/answer considerations and facilitate media-related capability negotiation, including codecs, bitrates, resolutions and the like. In one example, each UE uses an MPD to negotiate capabilities.

The first UE 402 and the second UE 406 have associated display capabilities and media capture capabilities. These include color space and dynamic range.

The first UE 402 and the second UE 406 are configured to identify matching color spaces and dynamic ranges, which are part of the capability negotiation.

Figure 4B:
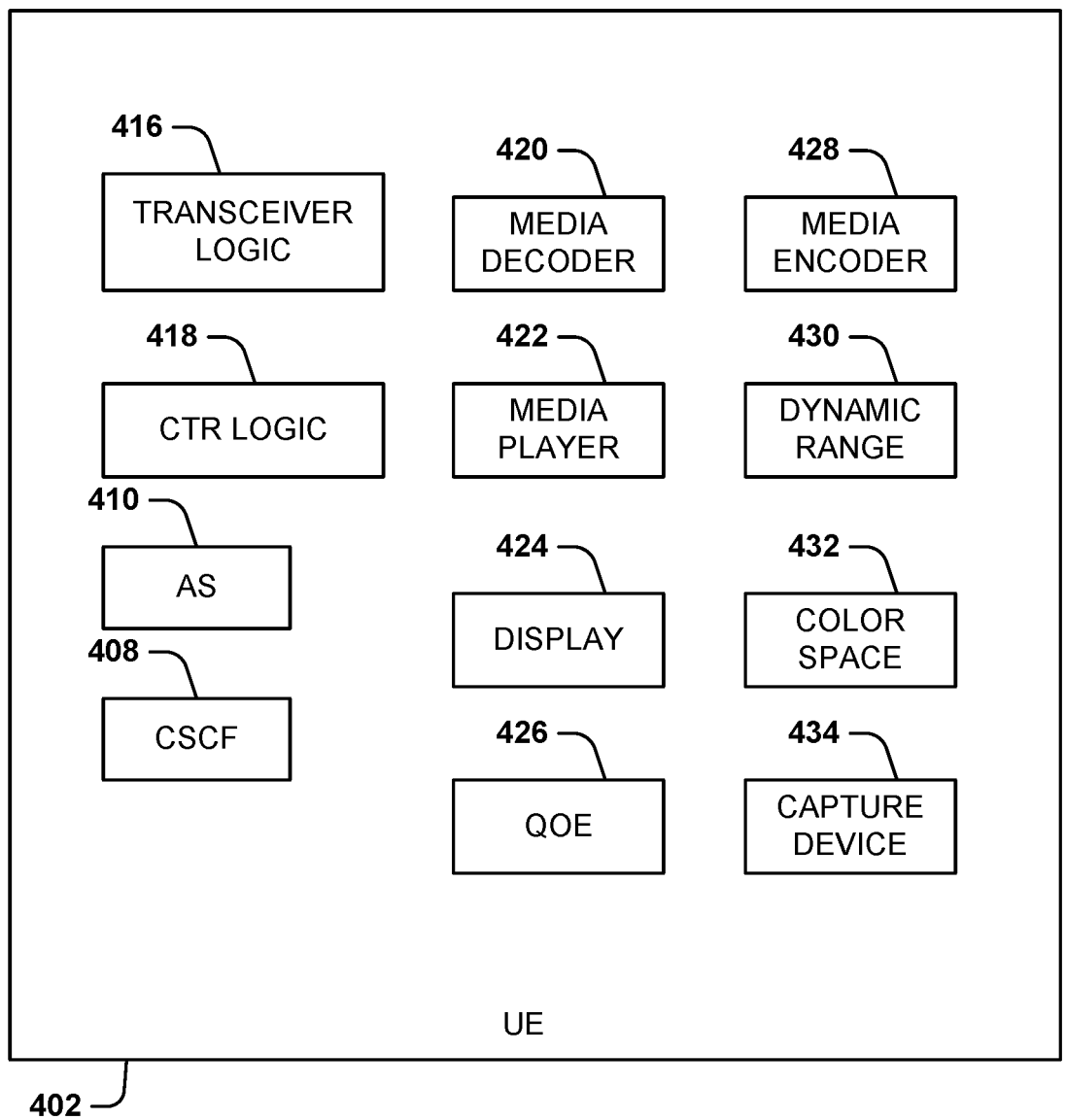
FIG. 4B is a diagram illustrating a user equipment (UE) 402 for conducting multimedia telephony services in accordance with various aspects.

FIG. 4B is a diagram illustrating a user equipment (UE) 402 for conducting multimedia telephony services in accordance with various aspects or embodiments. The mobile device or UE 402 can be used as the same referenced element in the arrangement 400. The UE 402 is provided and described with additional components and/or logic for illustrative purposes. Additionally, it is appreciated that the components of the UE 402 are shown as separate, but can be implemented together in logic and/or circuitry.

The UE 402 includes transceiver logic 416, control logic 418, an application server (AS) 410, a call session control function (CSCF) component 408, a media decoder 420, a media player 422, a display 424, a quality of environment (QOE) component 426, a media encoder 428, a dynamic range component 430 and a color space component 432.

Generally, the UE 402 can be configured to receive an adaptive stream and/or transmit an adaptive stream for conversational video. The adaptive stream(s) can include, for example real-time transport protocol (RTP) adaptive streams. For conversational video, the UE 402 can transmit/receive conversational video streams with one or more other UEs.

The transceiver logic 416 is configured to transmit an offer manifest file for the UE 402 and transmit an answer manifest file for the UE 402. Additionally, the transceiver logic 416 is configured to receive an answer manifest file from another UE. The transceiver logic 416 is also configured to send adaptive streams to one or more UEs and to receive adaptive streams from one or more UEs.

The offer manifest file includes available quality values for conversation video including offer dynamic range values and offer color space values and one or more available adaptive streams associated with the values. These values include ranges or suitable values for adaptive streams capable of being provided by the UE 402.

The answer manifest file for the UE 402 includes a selected video stream from one or more available video adaptive streams.

The answer manifest file for a second UE indicates a selected adaptive stream from one or more adaptive streams available from the second UE.

The media decoder 420 is configured to decode a received adaptive video stream. The media decoder 420 has one or more decoding techniques that can be used to decode the received adaptive video stream. Additionally, the media decoder 420 has decoding capabilities.

The media encoder 428 is configured to encode an adaptive video stream to be transmitted. The media encoder 428 has media encoding capabilities, which include one or more encoding techniques. The media encoder 428 is configured to encode the adaptive video stream in accordance with one or more quality values. These quality values include bitrate, frame rate, resolution, codec types, color space, dynamic range, and the like. The media encoder 428 can provide its output in a suitable format, such as a stream, file and the like.

The media player 422 is configured to render received and decoded adaptive video from the media decoder 420. The media player 422 has media playing capabilities, such as frame rate, resolution and the like.

The dynamic range component 430 is configured to adjust or modify the dynamic range of the transmitted adaptive stream based on a dynamic range quality value selected or specified in the answer manifest file from the second UE. In one example, the dynamic range component 430 directly alters the media content. In another example, the dynamic range component 324 adjusts encoding performed by the media encoder 428. In yet another example, the dynamic range component 430 adjusts a media source, such as a video capture device or camera, to alter the dynamic range of the media content.

The color space component 432 is configured to adjust or modify the color space of the transmitted adaptive stream based on a color space quality value selected or specified in the manifest file. In one example, the color space component 432 directly alters the media content to alter its color space, such as be increasing to 16 bits from 8 bits. In another example, the color space component 432 adjusts encoding performed by the media encoder 428. In yet another example, the color space component 432 adjusts a media source, such as a video capture device or camera, to alter the dynamic range of the transmitted adaptive stream.

The QOE component 426 is configured to generate a quality of experience (QoE) report that includes measured ambient light and the like based on a local environment of the UE 402. The QoE report can be provided to the second UE or other UEs.

The capture component 436 is configured to capture video content and has video capture capabilities. These capabilities include resolution, frame rate, dynamic range, color space and the like.

The control logic 418 is configured to identify device display capabilities for the associated display 424. The display 424 can be a TV, LCD screen or CRT. The device display capabilities can be known and stored in a memory component in one example. In another example, the device display capabilities are detected by the control logic 418. The device display capabilities can include dynamic range values and color space values supported by the display 424 and referred to as client dynamic range values and client color space values.

The control logic 418 is also configured to generate the offer manifest file for a transmit adaptive video stream and to generate the answer manifest file for a receive adaptive video stream. The offer manifest file is generated according to various device capabilities including capture capabilities, encoder capabilities, dynamic range capabilities, color space capabilities and the like. The answer manifest file is generated according to various playing capabilities including display capabilities, decoder capabilities, client dynamic range values, client color space values and the like.

In one example, the control logic 418 is configured to select a conversational video stream from a plurality of RTP adaptive streams based on client dynamic range values and client color space values. The selected stream is the receive adaptive video stream.

It is appreciated that suitable variations of the UE 402 are contemplated, including adding additional elements or components and/or omitting elements or components.

Figure 5:
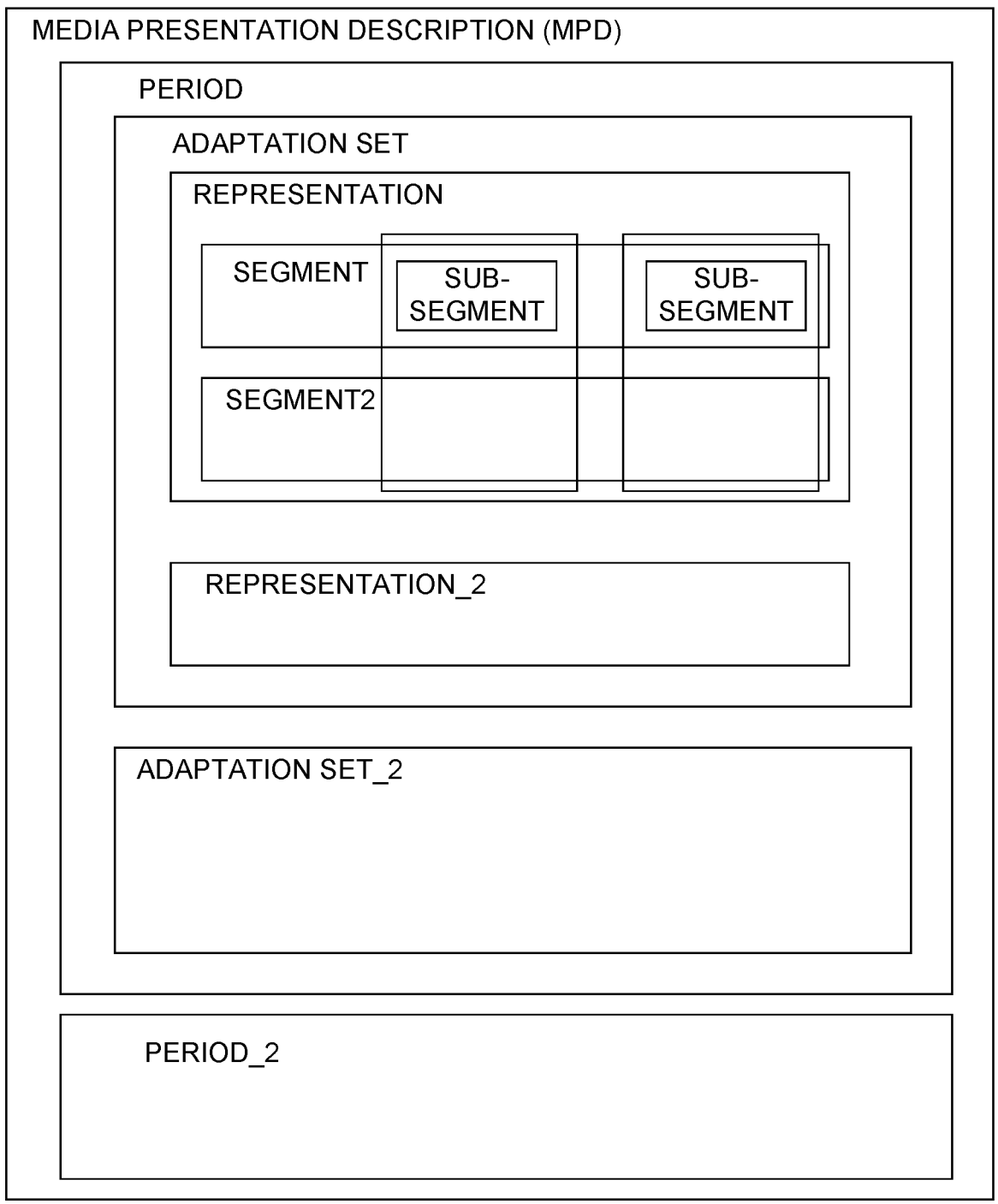
FIG. 5 is a diagram illustrating a media presentation description (MPD) data model 500 that includes dynamic range and color space information.

FIG. 5 is a diagram illustrating a media presentation description (MPD) data model 500 that includes dynamic range and color space information in accordance with various aspects or embodiments. The model 500 also includes quality information that corresponds to the dynamic range and the color space information. The MPD model 500 is provided as an example and it is appreciated that suitable variations are contemplated. The MPD model 500 can be used in the above arrangements and various aspect as a suitable MPD.

Generally, the MPD 500 is organized into one or more periods. Each period covers a duration of time or a timeline. The model 500 is shown with a PERIOD and a second period PERIOD_2.

Each period includes one or more adaptation sets. Each adaptation set includes one or more representations. Each representation is composed of media content components and sub-representations. Each representation also includes one or more segments or fragments of media content. The segments/fragments include media data and/or metadata to access, decode and present media content.

Each adaptation set includes dynamic range, color space and quality information. The dynamic range is an attribute and specifies the dynamic range for all representations in this adaptation set. The dynamic range can be expressed as a pair of minimum and maximum luminance values representing the range or interval for the dynamic range. For example, two integer values −5 and 10 can be used to report eh luminance range of $10^{-5}$ to $10^{10}$ $$\frac{cd}{m^2},$$

which is 15 order of magnitude of dynamic range variation.

In another example, the dynamic range can be described as the ratio of the maximum light intensity to the minimum light intensity, in terms of f-stop, which describes total light range by powers of 2. An ad hoc use of the term f-stop refers to the following dynamic ranges:

10 f-stops=a difference of $2^{10}$=1024:1 contrast ratio.
14 f-stops=a difference of $2^{14}$=16,384:1 contrast ratio.
16 f-stops=a difference of $2^{16}$=65,536:1 contrast ratio.
20 f-stops=a difference of $2^{20}$=1,048,576:1 contrast ratio In the ad hoc categorization of the dynamic ranges, the following definitions are typical: Standard Dynamic Range (SDR) is ≤10 f-stops, Enhanced Dynamic Range (EDR) is >10 f-stops and ≤16 f-stops, High Dynamic Range is (HDR) >16 f-stops Other kinds of metrics indicating dynamic range are also possible.

The dynamic range can also be specified in terms of a bit depth. Typical bit depth values may be in the range of 8-12.

The color space is an attribute that specifies the color space for all representations of an adaptation set. Some example color spaces include, for example:

CIE 1931 XYZ
Recommendation ITU-R BT.2020
DCI-P3 (SMPTE ST 428-1:2006)
Recommendation ITU-R BT.709
CIE Luv (CIE 1976)

In addition the bit depth for the color space (for each of the two chrominance components) may also be indicated.

The quality attribute provides upper and lower limits on a quality value. In one example, a lower value is a minimum quality value for all Representations in this Adaptation Set for each given pair of dynamic range and color space values. An upper limit is a maximum quality that specifies a maximum quality value in all Representations in this Adaptation Set for each given pair of dynamic range and color space values.

In one example, the quality values can be applied to a given period, adaptation set, segment or sub-segment. In another example, the quality values can apply to multiple segments, sub-segments or periods. The quality values can specify a range and/or include average values over multiple periods or segments.

In another embodiment, vectorized sets of quality values may be provided specifying the minimum and maximum quality levels for the adaptation set across different segments and sub-segments. The signalling is done such that for each combined dynamic range and color space configuration, a corresponding set of quality metrics can be provided.

Each representation can include a new attribute on quality, assigning a quality value to the content in the representation. This value may quantify the quality level over a specified timeline that may correspond to a period, segment or sub-segment. In an embodiment, this value may indicate a long-term (or average) quality measure over the entire duration of the representation. In another embodiment, vectorized sets of quality values may be provided specifying quality levels across different segments and sub-segments of the representation.

The quality values can be altered or modified by suitable signalling. The signalling is performed such that client and server agree on the quality values to be employed.

Quality metrics or value can include suitable metrics. Some example of suitable metrics include the following: Video MS-SSIM (Multi-Scale Structural SIMilarity), video MOS (mean opinion score), video quality metrics (VQM), structural similarity metrics (SSIM), peak signal-to-noise ratio (PSNR), perceptual evaluation of video quality metrics (PEVQ), etc. and other objective/subjective quality metrics.

It is appreciated that the quality values or metrics include values for dynamic range and color space. Thus, the dynamic range and/or color space quality values can be for one or more periods, adaptation sets, segments and/or sub-segments.

Figure 6:
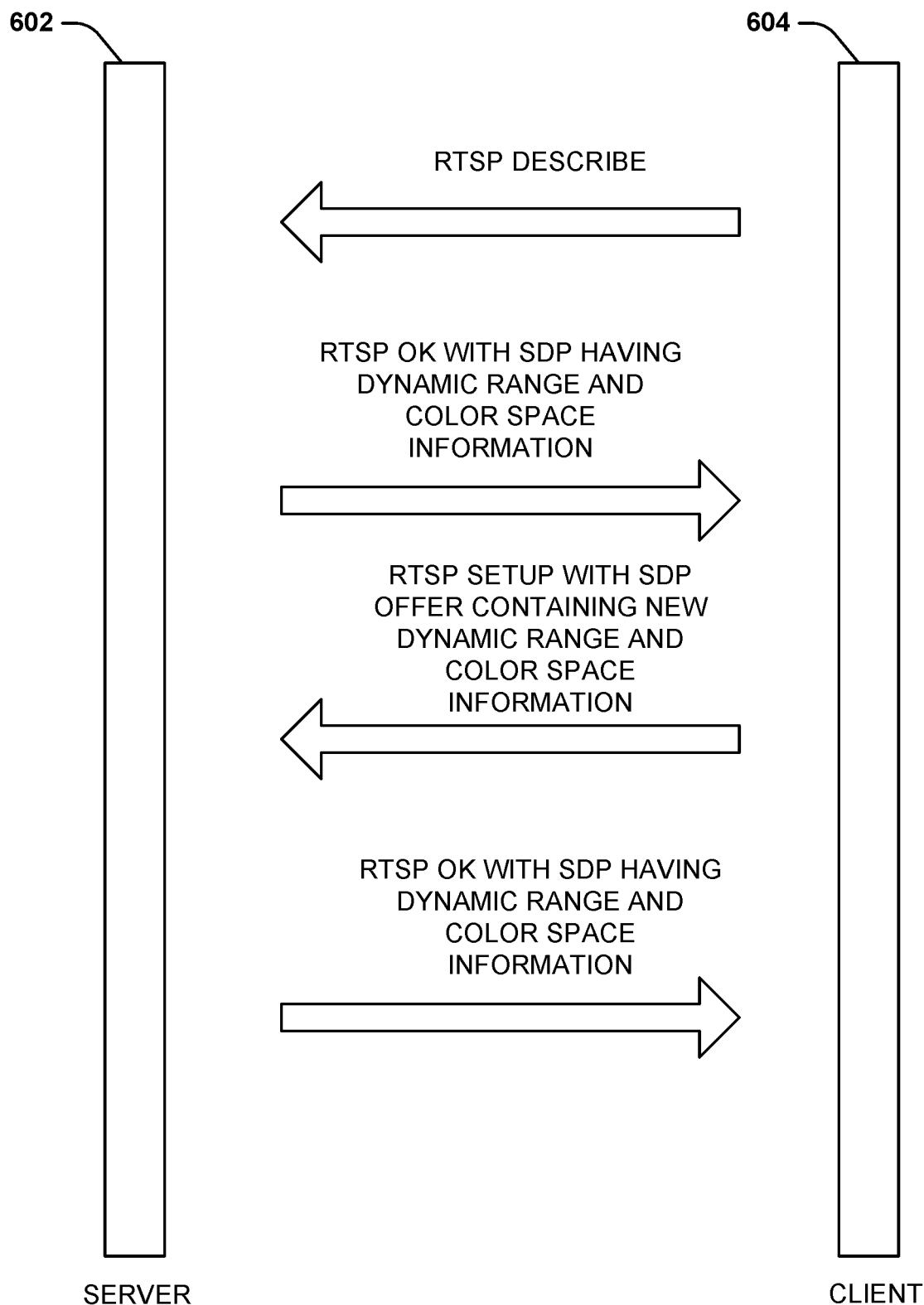
FIG. 6 is a diagram illustrating signaling for quality values that include dynamic range and color space information in accordance with various aspects.

FIG. 6 is a diagram illustrating signaling for quality values that include dynamic range and color space information in accordance with various aspects or embodiments. This example shows real time signaling protocol (RTSP)/session description protocol (SDP) signaling over PSS for session or capabilities negotiation that includes dynamic range and color space information.

FIG. 6 is provided as an example of signaling and negotiation that can be employed with the described arrangements and various aspects or embodiments, including the arrangements shown in FIGS. 1, 2, 3, 4A and 4B.

The SDP allows signaling for session description and capability negotiation that indicates dynamic range and color space information or attributes so that a server 602 and client 604 can determine suitable content to stream from the server 602 to the client 604. The server 602 includes capture and encoding devices or functionality and the client 604 includes decode, render and display devices or functionality. The server 602 and client 604 use the signaling to determine the suitable content that matches the capture and encoding devices with the decode, render and display devices, including the dynamic range and color space.

More specifically, the RTSP signaling can be used to include content-specific dynamic range and color space metadata. PSS can be used to initiate a re-negotiation via RTSP/SDP signaling in response to the client 604 determining that its display capabilities are not matched to the media content in terms of dynamic range and color space and then asking the server 602 to send the media content with a different configuration in terms of the dynamic range and the color space.

In this example, an RTSP DESCRIBE signal is sent from the client 604 to the server 602. The server 602 responds with an RTSP OK with SDP that includes dynamic range and color space information. The client 604 responds with RTSP SETUP with SDP, which includes an offer for new or client dynamic range and color space information. The server 602 responds with RTSP OK with revised server dynamic range and color space information that matches or is based on the client dynamic range and color space information. Streaming or transfer of media content from the server 602 to the client 604 can begin.

Figure 7:
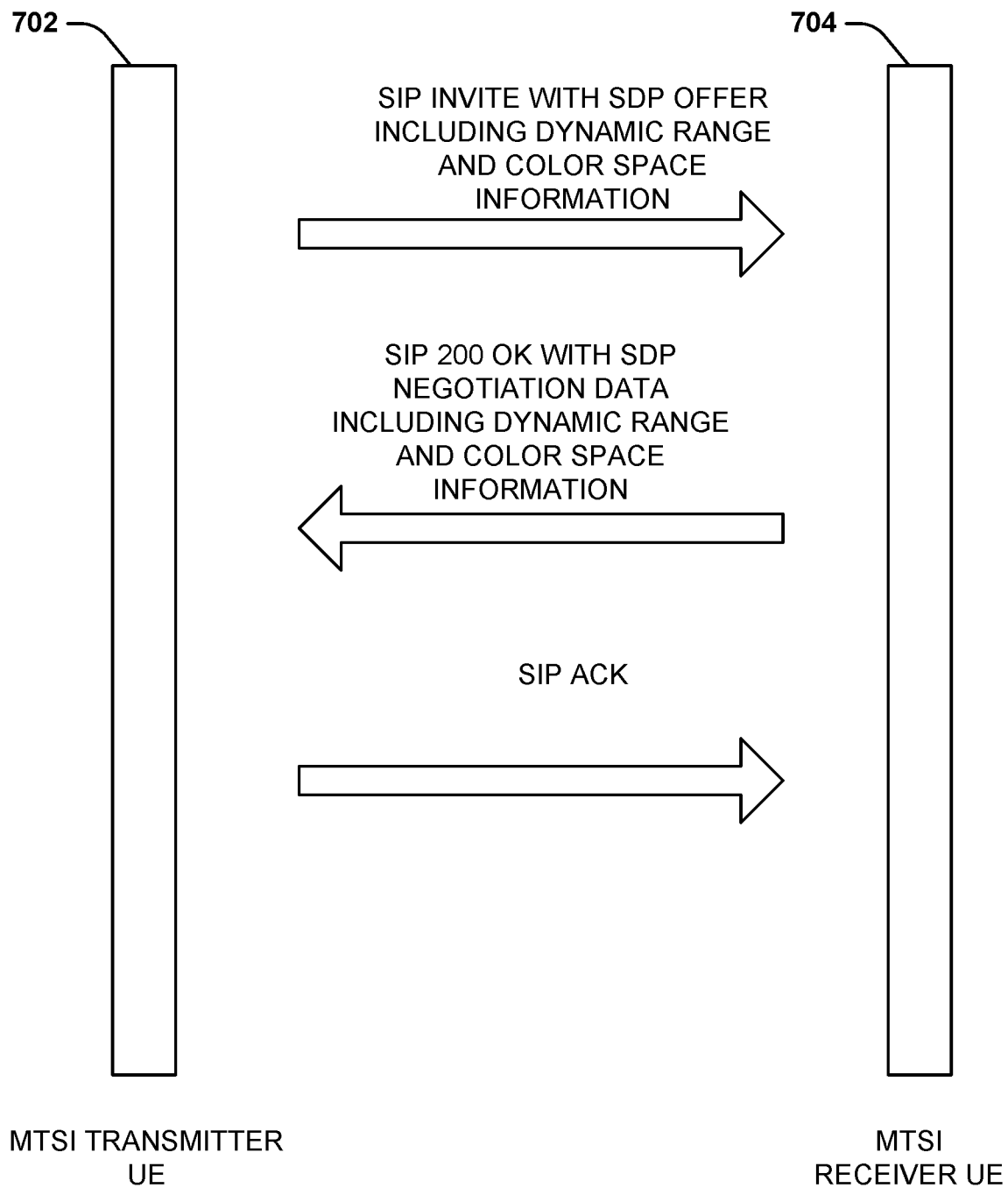
FIG. 7 is a diagram illustrating signaling for quality values that include dynamic range and color space information in accordance with various aspects.

FIG. 7 is a diagram illustrating signaling for quality values that include dynamic range and color space information in accordance with various aspects or embodiments. This example includes SIP/SDP signaling over MTSI for session negotiation that includes dynamic range and color space information.

FIG. 7 is provided as an example of signaling and negotiation that can be employed with the described arrangements and various, including the arrangements shown in FIGS. 1, 2, 3, 4A and 4B.

A transmitter UE 702 and a receiver UE 704 are present and described negotiating capabilities, including dynamic range and color space. The transmitter UE 702 sends an SIP INVITE with SDP offer that includes transmitter/server dynamic range and color space information. The receiver UE 704 responds with SIP 200 OK and includes SDP negotiation data that includes receiver or client dynamic range and color space information. The transmitter UE 702 responds with an SIP ACK. Streaming or transfer of media content from the transmitter UE 702 to the receiver UE 704 can begin.

Figure 8:
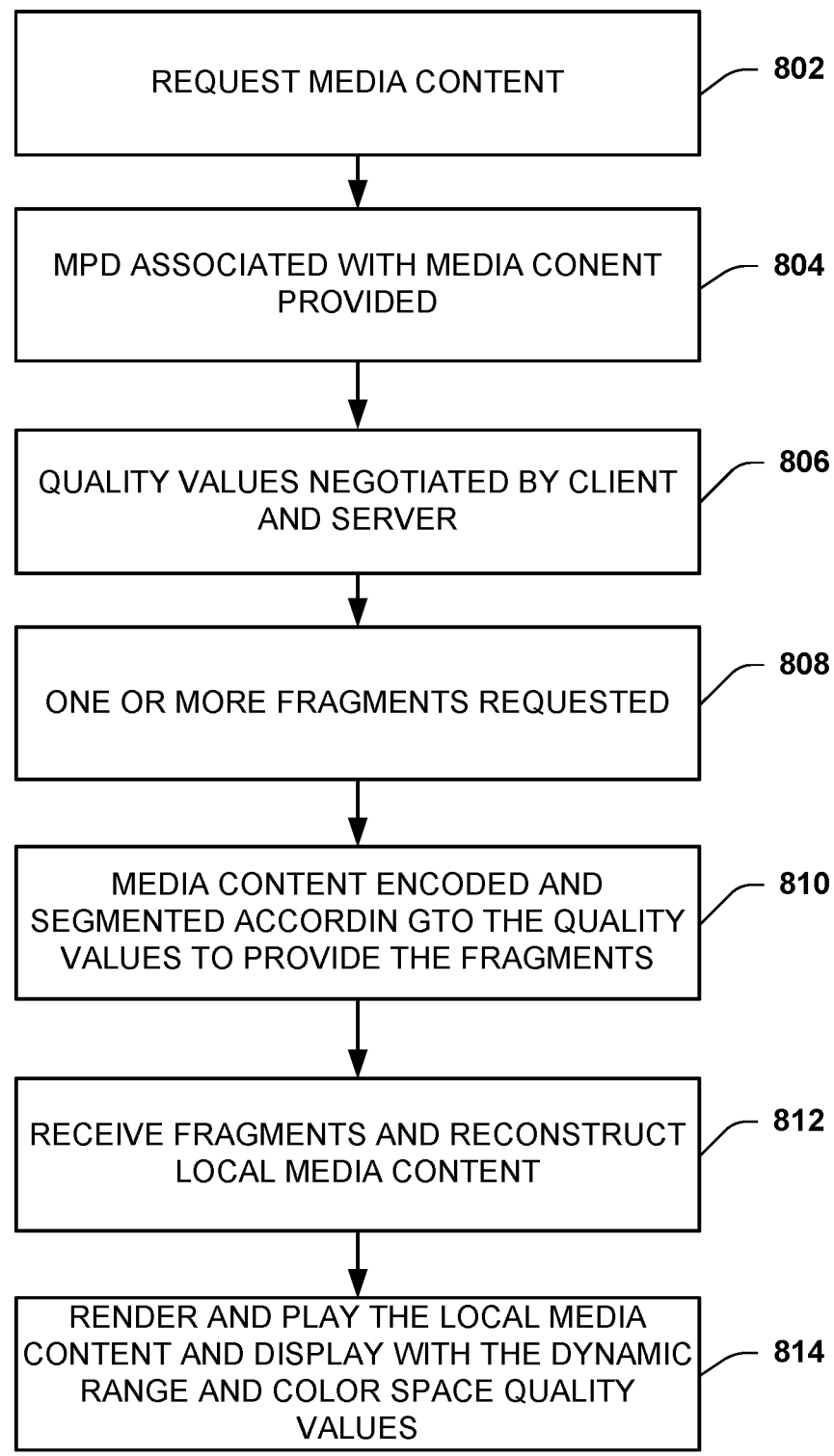
FIG. 8 is a flow diagram illustrating a method of performing adaptive streaming over HTTP (DASH) that incorporates dynamic range and color space information.

FIG. 8 is a flow diagram illustrating a method 800 of performing adaptive streaming over HTTP (DASH) that incorporates dynamic range and color space information in accordance with various aspects or embodiments. The method 800 generating sensing information. The method 700 selects sensing devices to generate the sensing information based on need or other factors.

The method begins at block 802, where a DASH client requests media content from a DASH server. The DASH client and the DASH server communicate over a cellular network, which includes devices including, but not limited to base stations, eNodeBs, mobile devices, UEs and the like. The DASH client and DASH server can be coupled to or part of a mobile device or UE.

The DASH client includes a display and video rendering capabilities. The display has associated client dynamic range and/or color space capabilities. The DASH server includes a video capture or media input that has associated server dynamic range and/or color space capabilities. The DASH server also includes an encoder and segmenter for encoding and segmenting the media content into encoded fragments. The DASH server can also include a media packetizer for packetizing encoded content into RTP.

The DASH server responds with information about the media content at block 804 in the form of an MPD, wherein the MPD includes a server dynamic range and a server color space for the requested media content.

The DASH client and the DASH server identifies and negotiate quality values for the requested media content at block 806.

The DASH client requests one or more fragments from the DASH server at block 808.

The DASH server generates and provides the one or more fragments at block 810.

The DASH client receives the one or more fragments and reconstructs local media content from the one or more fragments at block 812.

The DASH client renders and plays the reconstructed media content on a client display at block 814. The content is displayed with the dynamic range and color spaced quality values.

As playing requirements change or based on other situations, the quality parameters, including the dynamic range and color space quality values, QOE, and the like can alter or change. The DASH client can signal or negotiate revised quality values and the DASH server adapts encoding and segmentation accordingly to comply with the revised quality values.

While the methods described within this disclosure are illustrated in and described herein as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 9:
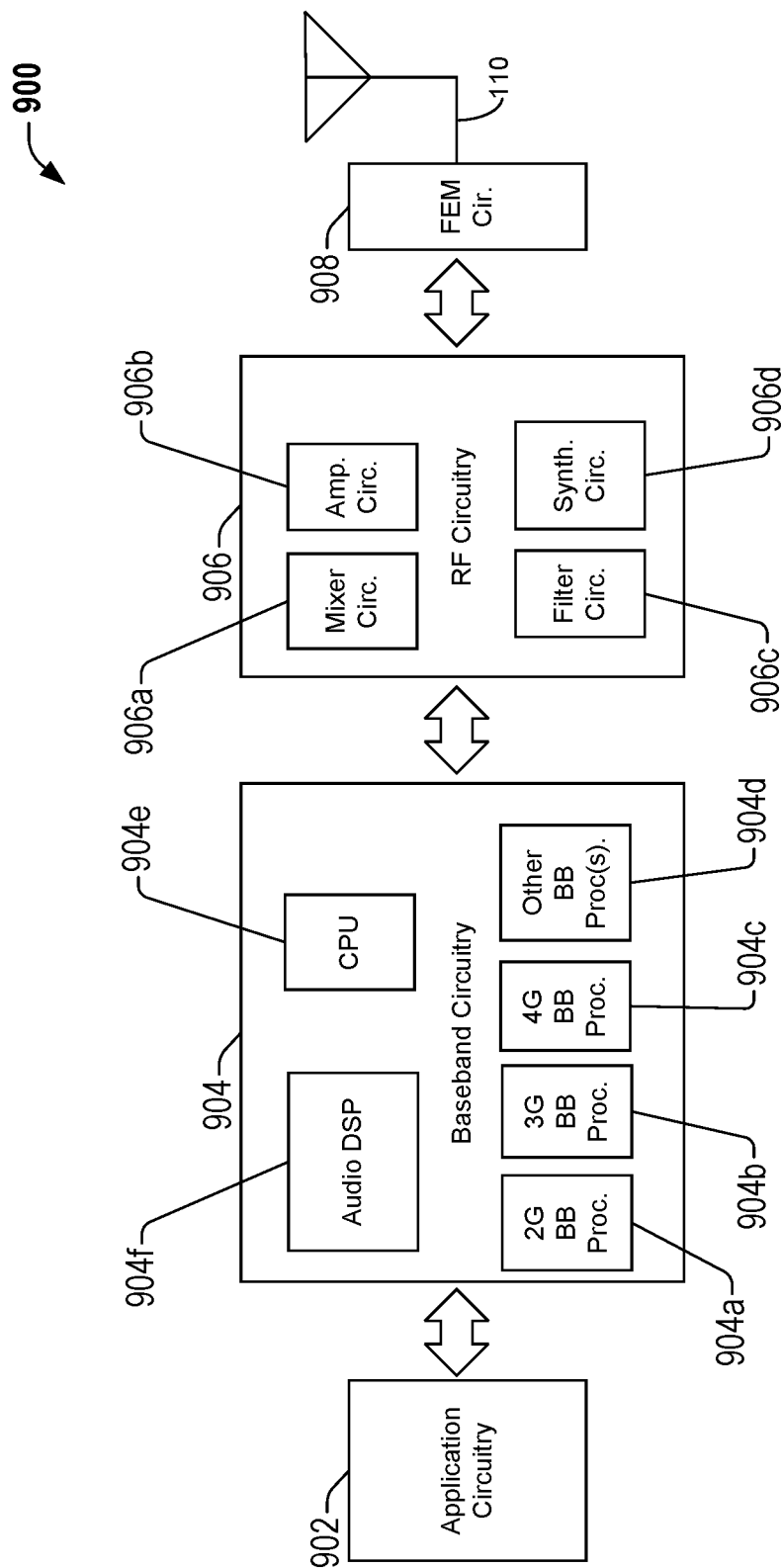
FIG. 9 illustrates, for one embodiment, example components of a User Equipment (UE) device.

Embodiments described herein can be implemented into a system using any suitably configured hardware and/or software. FIG. 9 illustrates, for one embodiment, example components of a User Equipment (UE) device 900. In some embodiments, the UE device 900 (e.g., the wireless communication device 101) can include application circuitry 902, baseband circuitry 904, Radio Frequency (RF) circuitry 906, front-end module (FEM) circuitry 908 and one or more antennas 980, coupled together at least as shown.

The application circuitry 902 can include one or more application processors. For example, the application circuitry 902 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The baseband circuitry 904 can include circuitry such as, but not limited to, one or more single-core or multi-core processors. The baseband circuitry 904 can include one or more baseband processors and/or control logic to process baseband signals received from a receive signal path of the RF circuitry 906 and to generate baseband signals for a transmit signal path of the RF circuitry 906. Baseband processing circuitry 904 can interface with the application circuitry 902 for generation and processing of the baseband signals and for controlling operations of the RF circuitry 906. For example, in some embodiments, the baseband circuitry 904 can include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) can handle various radio control functions that enable communication with one or more radio networks via the RF circuitry 906. The radio control functions can include, but are not limited to, signal modulation/demodulation, encoding/decoding, radio frequency shifting, etc. In some embodiments, modulation/demodulation circuitry of the baseband circuitry 904 can include Fast-Fourier Transform (FFT), precoding, and/or constellation mapping/demapping functionality. In some embodiments, encoding/decoding circuitry of the baseband circuitry 904 can include convolution, tail-biting convolution, turbo, Viterbi, and/or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 904 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 can be configured to run elements of the protocol stack for signaling of the PHY, MAC, RLC, PDCP and/or RRC layers. In some embodiments, the baseband circuitry can include one or more audio digital signal processor(s) (DSP) 904f. The audio DSP(s) 904f can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 904 and the application circuitry 902 can be implemented together such as, for example, on a system on a chip (SOC).

In some embodiments, the baseband circuitry 904 can provide for communication compatible with one or more radio technologies. For example, in some embodiments, the baseband circuitry 904 can support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol can be referred to as multi-mode baseband circuitry.

RF circuitry 906 can enable communication with wireless networks using modulated electromagnetic radiation through a non-solid medium. In various embodiments, the RF circuitry 906 can include switches, filters, amplifiers, etc. to facilitate the communication with the wireless network. RF circuitry 906 can include a receive signal path which can include circuitry to down-convert RF signals received from the FEM circuitry 908 and provide baseband signals to the baseband circuitry 904. RF circuitry 906 can also include a transmit signal path which can include circuitry to up-convert baseband signals provided by the baseband circuitry 904 and provide RF output signals to the FEM circuitry 908 for transmission.

In some embodiments, the RF circuitry 906 can include a receive signal path and a transmit signal path. The receive signal path of the RF circuitry 906 can include mixer circuitry 906a, amplifier circuitry 906b and filter circuitry 906c. The transmit signal path of the RF circuitry 906 can include filter circuitry 906c and mixer circuitry 906a. RF circuitry 906 can also include synthesizer circuitry 906d for synthesizing a frequency for use by the mixer circuitry 906a of the receive signal path and the transmit signal path. In some embodiments, the mixer circuitry 906a of the receive signal path can be configured to down-convert RF signals received from the FEM circuitry 908 based on the synthesized frequency provided by synthesizer circuitry 906d. The amplifier circuitry 906b can be configured to amplify the down-converted signals and the filter circuitry 906c can be a low-pass filter (LPF) or band-pass filter (BPF) configured to remove unwanted signals from the down-converted signals to generate output baseband signals. Output baseband signals can be provided to the baseband circuitry 904 for further processing. In some embodiments, the output baseband signals can be zero-frequency baseband signals, although this is not a requirement. In some embodiments, mixer circuitry 906a of the receive signal path can comprise passive mixers, although the scope of the embodiments is not limited in this respect.

In some embodiments, the mixer circuitry 906a of the transmit signal path can be configured to up-convert input baseband signals based on the synthesized frequency provided by the synthesizer circuitry 906d to generate RF output signals for the FEM circuitry 908. The baseband signals can be provided by the baseband circuitry 904 and can be filtered by filter circuitry 906c. The filter circuitry 906c can include a low-pass filter (LPF), although the scope of the embodiments is not limited in this respect.

In some embodiments, the mixer circuitry 906a of the receive signal path and the mixer circuitry 906a of the transmit signal path can include two or more mixers and can be arranged for quadrature downconversion and/or upconversion respectively. In some embodiments, the mixer circuitry 906a of the receive signal path and the mixer circuitry 906a of the transmit signal path can include two or more mixers and can be arranged for image rejection (e.g., Hartley image rejection). In some embodiments, the mixer circuitry 906a of the receive signal path and the mixer circuitry 906a can be arranged for direct downconversion and/or direct upconversion, respectively. In some embodiments, the mixer circuitry 906a of the receive signal path and the mixer circuitry 906a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 906 can include analog-to-digital converter (ADC) and digital-to-analog converter (DAC) circuitry and the baseband circuitry 904 can include a digital baseband interface to communicate with the RF circuitry 906.

In some dual-mode embodiments, a separate radio IC circuitry can be provided for processing signals for each spectrum, although the scope of the embodiments is not limited in this respect.

In some embodiments, the synthesizer circuitry 906d can be a fractional-N synthesizer or a fractional N/N+8 synthesizer, although the scope of the embodiments is not limited in this respect as other types of frequency synthesizers can be suitable. For example, synthesizer circuitry 906d can be a delta-sigma synthesizer, a frequency multiplier, or a synthesizer comprising a phase-locked loop with a frequency divider.

The synthesizer circuitry 906d can be configured to synthesize an output frequency for use by the mixer circuitry 906a of the RF circuitry 906 based on a frequency input and a divider control input. In some embodiments, the synthesizer circuitry 906d can be a fractional N/N+8 synthesizer.

In some embodiments, frequency input can be provided by a voltage controlled oscillator (VCO), although that is not a requirement. Divider control input can be provided by either the baseband circuitry 904 or the applications processor 902 depending on the desired output frequency. In some embodiments, a divider control input (e.g., N) can be determined from a look-up table based on a channel indicated by the applications processor 902.

Synthesizer circuitry 906d of the RF circuitry 906 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+8 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency ($f_{LO}$). In some embodiments, the RF circuitry 906 can include an IQ/polar converter.

FEM circuitry 908 can include a receive signal path which can include circuitry configured to operate on RF signals received from one or more antennas 980, amplify the received signals and provide the amplified versions of the received signals to the RF circuitry 906 for further processing. FEM circuitry 908 can also include a transmit signal path which can include circuitry configured to amplify signals for transmission provided by the RF circuitry 906 for transmission by one or more of the one or more antennas 980.

In some embodiments, the FEM circuitry 908 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 906). The transmit signal path of the FEM circuitry 908 can include a power amplifier (PA) to amplify input RF signals (e.g., provided by RF circuitry 906), and one or more filters to generate RF signals for subsequent transmission (e.g., by one or more of the one or more antennas 980.

In some embodiments, the UE device 900 can include additional elements such as, for example, memory/storage, display, camera, sensor, and/or input/output (I/O) interface.

Examples herein can include subject matter such as a method, means for performing acts or blocks of the method, at least one machine-readable medium including executable instructions that, when performed by a machine (e.g., a processor with memory or the like) cause the machine to perform acts of the method or of an apparatus or system for concurrent communication using multiple communication technologies according to embodiments and examples described.

Example 1 is an arrangement configured to be employed within one or more user equipment (UEs). The arrangement includes transceiver logic and control logic. The transceiver logic is configured to receive a media presentation description (MPD) for an adaptive streaming over hyper-text transfer protocol (DASH), wherein the MPD includes one or more adaption sets and/or representations. The control logic is configured to identify device display capabilities, to select content streams based on the device display capabilities, dynamic range and color space information and quality values signaled in the MPD for the one or more adaptation sets. The control logic is also configured to request the selected streams. The quality values are configured according to the dynamic range and color space information.

Example 2 includes the subject matter of Example 1, including or omitting optional elements, where the one or more adaptation sets are dynamic adaptive streaming over HTTP (DASH) adaptation sets.

Example 3 includes the subject matter of any one of Examples 1-2, including or omitting optional elements, where the MPD includes a resolution attribute and a frame rate attribute.

Example 4 includes the subject matter of any one of Examples 1-3, including or omitting optional elements, where the MPD includes a color space attribute for the one or more DASH adaptation sets and/or representations.

Example 5 includes the subject matter of any one of Examples 1-4, including or omitting optional elements, where the MPD includes a dynamic range attribute for the one or more DASH adaptation sets and/or representations.

Example 6 includes the subject matter of any one of Examples 1-5, including or omitting optional elements, where the control logic is configured to negotiate the selected quality values with a DASH server.

Example 7 includes the subject matter of any one of Examples 1-6, including or omitting optional elements, where the control logic is configured to requests media content and the MPD is associated with the requested media content.

Example 8 includes the subject matter of any one of Examples 1-7, including or omitting optional elements, where the control logic is configured to receive one or more fragments and reconstruct local media content from the received one or more fragments.

Example 9 includes the subject matter of any one of Examples 1-8, including or omitting optional elements, where the control logic is configured to alter the quality values based on changed device conditions.

Example 10 is an arrangement configured to be employed within one or more user equipment (UEs). The arrangement includes an input, a color space component, a dynamic range component and a media encoder. The input is configured to receive media content. The color space component is configured to adjust color space of the media content according to a target color space configuration. The dynamic range component is configured to adjust dynamic range of the media content according to a target dynamic range configuration. The media encoder is configured to encode the media content in accordance with a plurality of quality values and media configurations, including the target color space and the target dynamic range.

Example 11 includes the subject matter of Example 10, including or omitting optional elements, further including a media segmenter configured to segment the encoded media content into one or more fragments.

Example 12 includes the subject matter of any one of Examples 10-11, including or omitting optional elements, further including a media packetizer configured to packetize the encoded media content into one or more real-time transport protocol (RTP) packets.

Example 13 includes the subject matter of any one of Examples 10-12, including or omitting optional elements, where the quality values include a client compatible encoding.

Example 14 includes the subject matter of any one of Examples 10-13, including or omitting optional elements, where the dynamic range component is configured to negotiate the target dynamic range by signals with a client.

Example 15 includes the subject matter of any one of Examples 10-14, including or omitting optional elements, where the color space component is configured to negotiate the target color space by signals with a client.

Example 16 includes the subject matter of any one of Examples 10-15, including or omitting optional elements, further including a server control logic configured to generate a media presentation description (MPD) for the media content.

Example 17 includes the subject matter of any one of Examples 10-16, including or omitting optional elements, where the dynamic range component is configured to further adjust the dynamic range of the media content according to an adapted dynamic range configuration.

Example 18 includes the subject matter of any one of Examples 10-17, including or omitting optional elements, where the color space component is configured to further adjust the color space of the media content according to an adapted color space configuration.

Example 19 is an arrangement configured to be employed within one or more user equipment (UEs). The arrangement includes control logic and transceiver logic. The control logic is configured to transmit an offer manifest file and receive an answer manifest file. The offer manifest file includes offer dynamic range values and offer color space values for a plurality of real-time transport protocol (RTP) adaptive streams and the answer manifest file selects/identifies a conversational video stream from the plurality of RTP adaptive streams based on client dynamic range values and client color space values. The transceiver logic is configured to send the conversational video stream.

Example 20 includes the subject matter of Example 19, including or omitting optional elements, where the control logic is further configured to determine the offer dynamic range values and the offer color space values for the plurality of RTP adaptive streams.

Example 21 includes the subject matter of any one of Examples 19-20, including or omitting optional elements, further including client control logic configured to detect the client dynamic range values and the client color space values based on client display capabilities.

Example 22 includes the subject matter of any one of Examples 19-21, including or omitting optional elements, where the client control logic is configured to select the conversational video stream based on the client dynamic range values, the client color space values, the offer dynamic range values and the offer color space values and generate the answer manifest file.

Example 23 includes the subject matter of any one of Examples 19-22, including or omitting optional elements, where the control logic is configured to determine capture and encoding capabilities and determine offer dynamic range values and offer dynamic color space values based on the determined capture and encoding capabilities.

Example 24 includes the subject matter of any one of Examples 19-23, including or omitting optional elements, where the offer manifest file and the answer manifest file are communicated in a session description protocol (SDP) of a multimedia telephony services over IP multimedia subsystem (IMS) (MTSI) session.

Example 25 includes the subject matter of any one of Examples 19-24, including or omitting optional elements, further including an encoder configured to encode packets for the conversational video stream.

Example 26 is one or more computer-readable media having instructions that, when executed, cause one or more user equipment (UEs) to perform operations. The operations cause the one or more UEs to request media content, receive a media presentation description (MPD) for the media content containing dynamic range and color space information for a plurality DASH adaptation sets and/or representations, and negotiate quality values based on a target color space and a target dynamic range, which are based on the MPD and client display capabilities.

Example 27 includes the subject matter Examples 26, including or omitting optional elements, where the operations include to request one or more fragments of the media content.

Example 28 includes the subject matter of any one of Examples 25-26, including or omitting optional elements, where the operations further include to reconstruct one or more received fragments into reconstructed media content, render the reconstructed media content, and play the rendered reconstructed media content on a display device using color space and dynamic range capabilities that match the dynamic range and color space information signaled in the MPD.

Example 29 is an apparatus configured to be employed within one or more user equipment (UEs). The apparatus includes a means for requesting media content, a means for receiving a media presentation description (MPD) for the media content containing dynamic range and color space information for the various DASH adaptation sets and/or representations, and a means for negotiating quality values based on a target color space and a target dynamic range. The target color space and the target dynamic range are based on the MPD and client display capabilities.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. An arrangement configured to be employed within one or more user equipment (UEs), the arrangement comprising:
   transceiver logic circuitry configured to receive a media presentation description (MPD) for a media content associated with a dynamic adaptive streaming over hyper-text transfer protocol (DASH), wherein the MPD includes one or more DASH adaption sets and/or representations; and
   control logic circuitry configured to:
      identify device display capabilities,
      select content streams based on the identified device display capabilities, as well as dynamic range, color space information and quality values associated with the media content that are signaled in the received MPD for the one or more DASH adaptation sets and/or representations, and
      request the selected content streams, wherein the quality values are configured according to the dynamic range and the color space information.

2. The arrangement of claim 1, wherein the MPD includes a resolution attribute and a frame rate attribute.

3. The arrangement of claim 1, wherein the MPD includes a color space attribute for the one or more DASH adaptation sets and/or representations.

4. The arrangement of claim 1, wherein the control logic circuitry is configured to negotiate the quality values with a DASH server.

5. The arrangement of claim 1, wherein the control logic circuitry is configured to request the media content and the MPD is associated with the requested media content.

6. The arrangement of claim 1, wherein the control logic circuitry is configured to receive one or more fragments and reconstruct local media content from the received one or more fragments.

7. The arrangement of claim 1, wherein the control logic circuitry is configured to alter the quality values based on changed device conditions.

8. One or more non-transitory computer-readable media having instructions that, when executed, cause one or more user equipments (UEs) to:
   request media content;
   receive a media presentation description (MPD) for the requested media content containing dynamic range and color space information for various DASH adaptation sets and/or representations; and negotiate for quality values based on a target color space and a target dynamic range, where the target color space and the target dynamic range are based on the MPD and client display capabilities.

9. The non-transitory computer-readable media of claim 8, comprising one or more computer-readable media having instructions that, when executed, further cause the one or more user equipments (UEs) to:
request one or more fragments of the media content.

10. The non-transitory computer-readable media of claim 8, comprising one or more computer-readable media having instructions that, when executed, further cause the one or more user equipments (UEs) to:
reconstruct one or more received fragments into reconstructed media content;
render the reconstructed media content; and
play the rendered reconstructed media content on a display device using color space and dynamic range capabilities that match the dynamic range and color space information signaled in the MPD.

* * * * *